(12) United States Patent
Kamat (10) Patent No.: US 7,275,225 B2
(45) Date of Patent: Sep. 25, 2007

(54) CORRECTING DESIGN DATA FOR MANUFACTURE

(75) Inventor: Vishnu G. Kamat, Cupertino, CA (US)

(73) Assignee: Invarium, Inc., San Jose, CA (US)

( * ) Notice: Subject to any disclaimer, the term of this patent is extended or adjusted under 35 U.S.C. 154(b) by 317 days.

(21) Appl. No.: 10/860,852

(22) Filed: Jun. 4, 2004

(65) Prior Publication Data

US 2005/0273734 A1 Dec. 8, 2005

(51) Int. Cl.
*G06F 17/50* (2006.01)

(52) U.S. Cl. .............................. 716/4; 716/19; 716/21

(58) Field of Classification Search ................ 716/20, 716/19, 4, 21
See application file for complete search history.

(56) References Cited

U.S. PATENT DOCUMENTS

| | | | | |
|---|---|---|---|---|
| 4,918,627 A | * | 4/1990 | Garcia et al. ................ | 702/82 |
| 5,586,052 A | * | 12/1996 | Iannuzzi et al. .............. | 703/1 |
| 6,584,609 B1 | | 6/2003 | Pierrat et al. ................ | 716/19 |
| 7,099,803 B1 | * | 8/2006 | Rappoport et al. ............ | 703/1 |

OTHER PUBLICATIONS

Kotani, Toshiya; Ichikawa, Hirotaka; Urakami, Takanori; Nojima, Shigeki; Kobayashi, Sachiko; Oikawa, Yoko; Tanaka, Satoshi; Ikeuchi, Aisuiko; Suzuki, Kiminobu; Inoue, Soichi, "Efficient Hybrid Optical Proximity Correction Method Based on the Flow of Design for Manufacturability (D/M)," Photomask and Noxi-Generation Lithography Mask Technology X, Proceedings of SPIE vol. 5190 (2003), p. 628-637.

Rieger, Michael L.; Mayhew, Jeffrey P.; Li, Jiangwei; Shiely, James P., "OPC Strategies to Minimize Mask Cost and Writing Time," 21st Annual Bacus Symposium on Photomask Technology, Proceedings of SPIE vol. 4562 (2002), pp. 154-160.

Socha, Robert; Van Den Broeke, Douglas; Hsu, Stephen; Chen, J. Fung; Laidig, Tom; Corcoran, Noel; Hollerbach, Uwe; Wampler, Kurt E.; Shi, Xuelong; Conley, Will, "Contact Hole Reticle Optimization by Using Interference Mapping Lithography (IML)," Optical Microlithography XVII, Proceedings of SPIE vol. 5377 (2004) pp. 222-240.

Erdmann, Andreas; Führner, Tim; Schnattinger, Thomas; Tollkühn, Bernd, "Towards Automatic Mask and Source Optimization for Optical Lithography," Optical Microlithography XVII, Proceedings of SPIE vol. 5377 (2004) pp. 646-657.

Cobb, Nicolas Bailey, "Fast Optical and Process Proximity Correction Algorithms for Integrated Circuit Manufacturing," Spring 1998.

* cited by examiner

*Primary Examiner*—Sun James Lin
(74) *Attorney, Agent, or Firm*—John Smith-Hill; Smith-Hill and Bedell (57) ABSTRACT

A method of correction for design data includes the steps of sequentially applying a plurality of corrections to a plurality of features based on a plurality of feature tolerances to design data in a predetermined order, and providing corrected design data.

67 Claims, 3 Drawing Sheets

CORRECTING DESIGN DATA FOR MANUFACTURE

BACKGROUND OF THE INVENTION

This invention relates to correcting design data for manufacture.

A conventional integrated circuit design process includes two major operations: logic design and physical design. During the logic design, a design concept is ordinarily described using a hardware description language and is then converted into netlist data, i.e. circuit design data in a schematic form, specifying electronic components at a functional level and the connections between these components. During the physical design, the manner in which circuit components and connections are to be placed and routed is determined. Once placement of the components and routing of the connections are determined, physical design data, i.e. circuit design data in a form that can be used in the fabrication of the circuit on wafer, is generated for controlling integrated circuit (IC) fabrication. The physical design data defines a set of binary patterns. The physical design data generally defines each pattern as multiple polygons (usually rectangles), which are frequently referred to as geometric features. Each polygon has edges, and each edge is defined by integer value coordinates of its two opposite ends in an x, y coordinate system. The polygons may include rectangles each having a long edge aligned with one of the coordinate axes and a short edge aligned with the other coordinate axis.

An optical lithographic stepper system or other patterning system transfers the patterns defined by the physical design data sequentially to a semiconductor wafer. Each pattern, as thus transferred, specifies areas of the wafer that are to be processed in a subsequent manufacturing step. The lithographic system maps the coordinate system in which the edges of the polygons are defined with reference to a predefined square array of grid points with a certain step size. For example some designs use a 10 nm step size (wafer level).

Generation of the physical design data is typically iterative, in that the software tool that is used to generate the physical design data from the netlist data iteratively modifies the layout or pattern until it arrives at a layout that satisfies a set of constraints called the manufacturing design rules. These constraints include within layer physical design constraints and the inter-layer physical design constraints derived from lithographic and device manufacturing capabilities.

The result of transferring a geometric feature to the wafer is referred to as the wafer result. The wafer result does not necessarily match precisely the corresponding geometric feature. For example, the patterning system may introduce distortion into the transfer of the features of the physical design data to the wafer, and the manufacturing processes, including, e.g. manufacture of lithographic exposure masks and chemical processing of the wafer, may result in further deviation between a feature of the physical design data and the physical embodiment of that feature in the processed wafer. A geometric feature may have associated tolerances, which specify variations permitted in the wafer result of a geometric feature such that even though the manufactured circuit does not match precisely the physical design data, the manufactured circuit will nevertheless meet the circuit performance specification. For a given geometric feature, tolerances may include specification of boundaries for the location of an edge of a rectangle along a direction perpendicular to the length of that edge in addition to the permitted variation in its critical dimension(s) on wafer. The critical dimension is the length measurement of the geometric feature that is critical. For example for a gate layer, the device gate length is a critical dimension, while for the landing pad, the two dimensions of length and width are critical dimensions.

The definition of physical design data does not preclude the possibility of corrections or adjustments. The technique known as optical and process correction (OPC) is an approach to making corrections to the physical design data in order to accommodate differences between the image transferred to the wafer and the intended design due to distortion introduced by the patterning system and the manufacturing processes. OPC thus alters the original physical layout (defined by the physical design data) to compensate for distortions caused by, for example, local optical diffraction, long range effects such as etch loading on mask and wafer, optical flare, and resist process effects among others. So-called model based OPC may be performed by modeling the final manufactured output of a semiconductor design and then determining what changes should be made to the physical design data to obtain a desired end result. Rule based OPC involves creating and applying a set of correction rules. Each rule tests the physical design data for a particular condition where correction may be necessary and if the condition is found, applies a correction to the physical design data.

Current methods of OPC may be divided into the following different categories:

(a) Apply OPC to all features of the layout design with the same tolerance or with different tolerances depending on the geometrical shape, such as whether the feature is a straight line segment, a corner feature or a line end.

(b) Apply OPC in a hybrid fashion of both rule-based OPC and model-based OPC.

(c) Apply OPC with different tolerances for critical and non-critical features (design aware or frugal OPC).

A disadvantage of current OPC techniques is that features are corrected without prioritization of the features as a function of the tolerance of the feature. As a result, features with smaller tolerance may be corrected before the environment of neighboring features has been fully defined and as a result there is an opportunity for error in the corrected design.

SUMMARY OF THE INVENTION

In accordance with a first aspect of the invention there is provided a method of correction for design data, comprising the steps of sequentially applying a plurality of corrections to a plurality of features based on a plurality of feature tolerances to design data in a predetermined order; and providing corrected design data.

In accordance with a second aspect of the invention there is provided a method of correction for design data, comprising the steps of classifying the plurality of features into a first plurality of features based on associated feature tolerances and a second plurality of features based on associated feature tolerances; applying a first plurality of corrections to the first plurality of features to initial design data to provide intermediate design data; sequentially applying a second plurality of corrections to the intermediate design data; and providing corrected design data.

In accordance with a third aspect of the invention there is provided a device created from corrected design data generated by sequentially applying a plurality of corrections based on a plurality of feature tolerances to design data in a predetermined order; and providing the corrected design data.

In accordance with a fourth aspect of the invention there is provided a device created from corrected design data generated by classifying the plurality of features into a first plurality of features based on associated feature tolerances and a second plurality of features based on associated feature tolerances; applying a first plurality of corrections to the first plurality of features to provide intermediate design data; sequentially applying a second plurality of corrections to the intermediate data; and providing corrected design data.

In accordance with a fifth aspect of the invention there is provided a correction computer program embodied on computer readable media, comprising a tolerance application code segment for sequentially applying a plurality of corrections based on a plurality of feature tolerances to an associated plurality of geometric features to initial design data; and a correction code segment that provides the corrected design data using corrections on a plurality of features based on the associated plurality of feature tolerances.

In accordance with a sixth aspect of the invention there is provided a correction computer program embodied on computer readable media, comprising an arranging code portion for arranging a plurality of feature tolerances in a predetermined order; a first application code portion for applying a plurality of corrections based on a plurality of feature tolerances to initial design data to provide intermediate design data; a second application code portion for sequentially applying the plurality of corrections based on a plurality of feature tolerances to the intermediate design data; and an output code portion for providing corrected design data.

In accordance with a seventh aspect of the invention there is provided a correction system, comprising at least one processor; and a processor readable memory accessible by at least one processor that stores instructions for applying a plurality of corrections based on a plurality of feature tolerances to initial design data to provide intermediate design data; sequentially applying a plurality of corrections based on a plurality of feature tolerances to the intermediate design data in a predetermined order; and outputting corrected design data.

In accordance with an eighth aspect of the invention there is provided a correction system, comprising at least one processor; and a processor readable memory accessible by at least one processor that stores instructions for sequentially applying a plurality of corrections based on a plurality of feature tolerances to initial design data in a predetermined order; and providing the corrected design data.

In accordance with a ninth aspect of the invention there is provided an integrated circuit mask formed by sequentially applying a plurality of corrections based on a plurality of feature tolerances to initial design data in a predetermined order; and providing the corrected design data.

In accordance with a tenth aspect of the invention there is provided an integrated circuit mask formed by designating a first plurality of design features based associated feature tolerances and designating a second plurality of design features based on associated feature tolerances; applying a first plurality of corrections to the first plurality of design features to provide intermediate design data; sequentially applying a second plurality of corrections to the intermediate design data to the second plurality of design features; and providing corrected design data.

In accordance with an eleventh aspect of the invention there is provided a method of correction for design data, comprising the steps of sequentially applying a plurality of corrections based on feature tolerances to initial design data in an order from a higher tolerance feature to a lower tolerance feature; and providing corrected design data.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
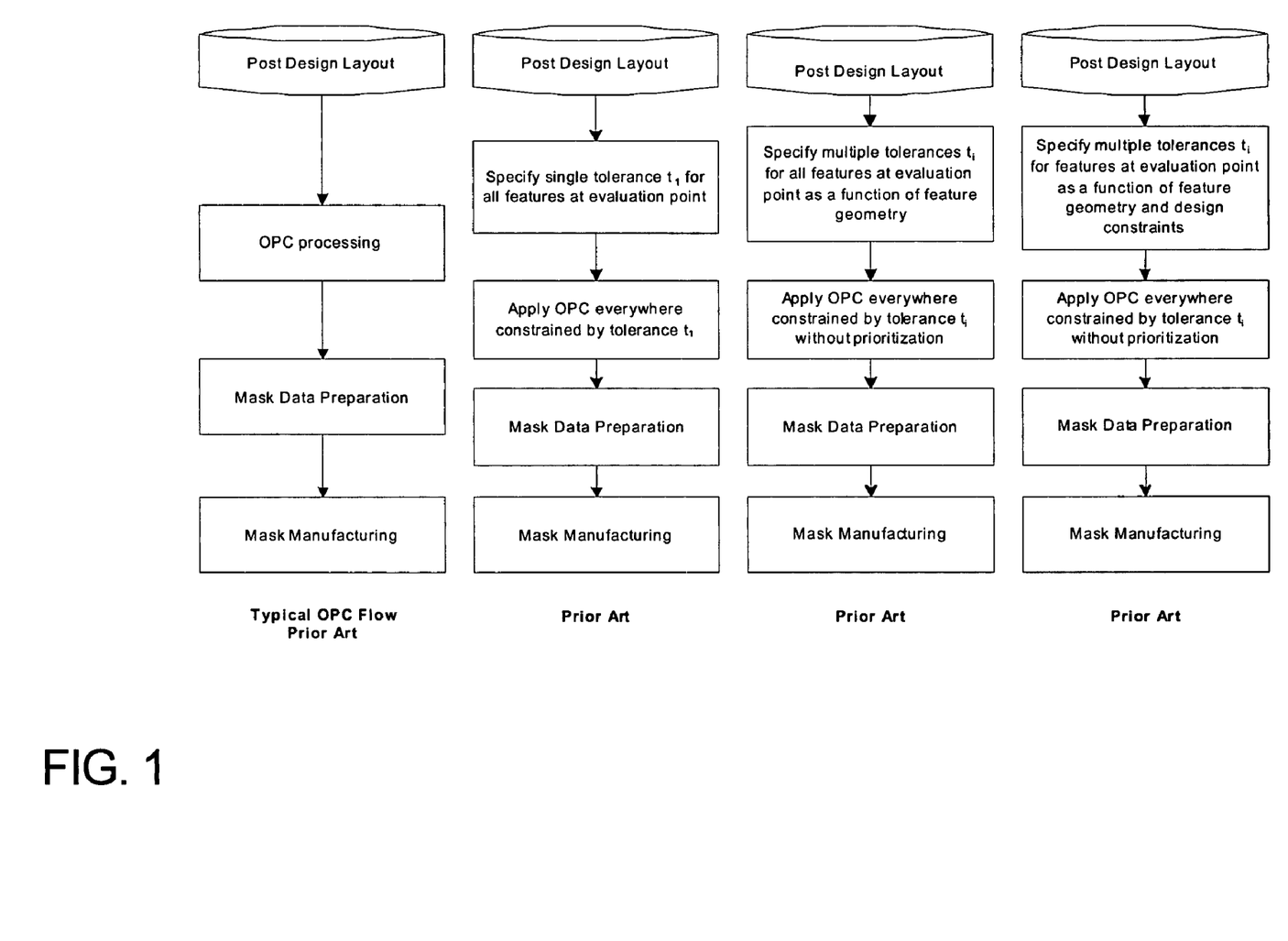
FIG. 1 illustrates typical OPC flow in accordance with conventional processes.
Figure 2:
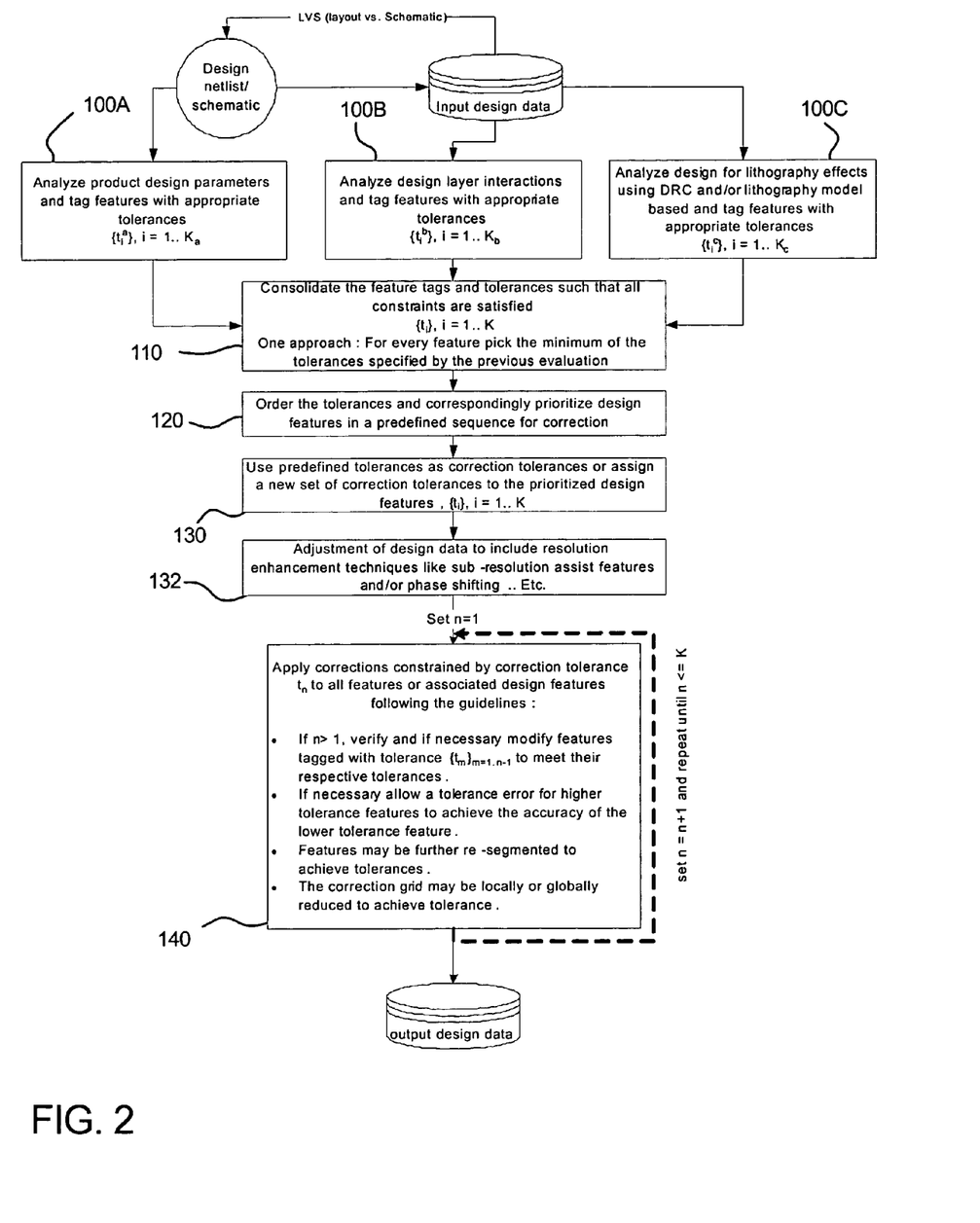
FIG. 2 is a flowchart illustrating a first method embodying the present invention.

Referring to FIG. 2, the process receives both netlist data (design netlist/schematic) that describes the circuit in terms of circuit elements and wiring between the circuit elements and physical design data (input design data) that describes the binary patterns that are to be successively transferred to the wafer. For the sake of simplicity, we will discuss rectangular pattern features but it will be appreciated that a pattern may include both rectangular and non-rectangular features.

The tolerance associated with a feature may be based on lithography constraints, i.e. a tolerance that must be met in order for the feature to be accurately transferred to the wafer by the lithographic system, or circuit design constraints, i.e. a tolerance that must be met in order for the completed circuit to perform in accordance with the design specification. A tolerance on location of a polygon edge that is aligned with one of the coordinate axes has a magnitude that may be specified by at least one number that represents the amount by which the edge may deviate from its nominal position along the other coordinate axis, expressed in grid steps. A lower tolerance magnitude means that a lower deviation can be accepted in transfer of the feature to the wafer; a higher tolerance means that a higher deviation can be accepted. A given tolerance might have two or more values associated with it, e.g. +10 nm, −5 nm in edge position and +/−15 nm in critical dimension(s).

The process illustrated by FIG. 2 employs OPC to adjust the input physical design data in several iterations to produce output physical design data. OPC may change the width of a line of a mask layer or change the location of a feature of a mask layer. More generally, OPC changes the location of an edge of a polygon.

In accordance with the method illustrated in FIG. 2, in step 100A the program analyzes the netlist data in terms of product design parameters, i.e. parameters that define the geometric and electrical relationship between the different layers that represent the design, in order to identify features and determine tolerances $\{t_i^a\}$ associated with the netlist features. The product design parameters define the individual variation allowed in the printing of the variety of geometric features that make up a circuit so as to meet its specification. For example, a transistor gate layer may be composed of transistor gates, interconnect polygons and landing pads, and the transistor gates have a lower tolerance to geometric variation on wafer compared to the interconnect polygons and landing pads. Relative tolerance relationship between the interconnect polygons and landing pads depend on the process design rules that guided the circuit layout. A list of critical paths defined within the netlist data may define a subset of polygon features in the physical design data whose geometric dimension on wafer are relatively more critical than the others.

Having identified the features and determined the tolerances (which may be included explicitly in the netlist data or calculated on the basis of the netlist data), the program tags each feature with the appropriate tolerance and thereby associates a tolerance with the feature.

In step 100B, the program analyzes the physical design data in terms of the design layer interactions to identify features and determine tolerances $\{t_i^b\}$ associated with these features. In step 100C, the program analyzes the input design data for lithography effects (constraints introduced by optical effects due to feature proximity, environment, and manufacturing processing effects) using DRC and/or a lithography model and determines tolerances $\{t_i^c\}$ associated with the device features. Features that may be tagged as high tolerance features based on design constraints may acquire a lower tolerance assignment due to lower process latitudes or higher mask error enhancement factors (MEEF), corner rounding effects, etc.

For many of the features that are tagged in step 100A, 100B or 100C, there will be one or more corresponding features tagged in one or more of the other steps. Thus, for a given feature, steps 100A, 100B and 100C result in one, two or three associated tolerances.

In step 110, the program consolidates the three parent sets of feature tags and tolerances, provided by steps 100A, 100B and 100C respectively. For a feature that is unique to one parent set, that feature and its associated tolerance is included in the consolidated set, whereas for a feature that is included in more than one parent set, a single tolerance associated with that feature is included in the consolidated set such that the tolerance satisfies the constraints of the two or three parent sets that contain the feature. One possible approach is to select the minimum of the two or three tolerances of the parent sets respectively. As mentioned above, a single tolerance might specify more than one value. For example, for a given feature one tolerance might be +13, −7 and another tolerance might be +12, −8, and in this case the consolidate set would likely include the tolerance +12, −7.

In step 120, the program orders the tolerances and correspondingly prioritizes the design features for correction. Typically, the program orders the features in sequence from the feature having the largest tolerance to the feature having the smallest tolerance such that for the tolerances $\{t_i\}$, i=1 ... k, $t_i > t_j$ if i<j. However, other sequences, e.g. smallest tolerance to largest tolerance, are possible.

In step 130, the program assigns a tolerance to each feature. The assigned tolerance might be the tolerance that was used in step 120 for ordering the tolerances, or alternatively another tolerance may be assigned. For example, a designer might tighten a tolerance so that the resulting device will exceed minimum performance requirements or in order to increase process yield. Alternatively, the requirements imposed by step 100A, 100B or 100C might be too stringent such that a device cannot be fabricated based on these tolerances, in which case the tolerance should be relaxed.

In step 132, the program adjusts the physical design data by implementing resolution enhancement techniques, such as sub-resolution assist features and/or phase shifting among others.

After step 132, the program sets an index n=1 and enters an iterative loop that contains step 140, in which the program applies OPC constrained by the tolerance $t_n$ to features of the input physical design data and increments n by one until n=k. Each iteration of step 140 up to iteration n−1 produces adjusted physical design data that is further refined in the next iteration of that step.

In each iteration, OPC adjusts the physical design data in order to ensure that the pattern transferred to the wafer will match as closely as possible the original physical design data. The adjustments are constrained by the tolerances associated with the respective features. Suppose, for example, the tolerance $t_n$ imposes bounds +11, −9 grid points on change in the x position of a polygon edge that is aligned with the y axis. In the nth iteration, step 140 allows OPC to adjust the position of each rectangle edge that is aligned with the y axis by up to +11 or −9 grid points subject to the tolerance (relative to nominal position) that was assigned to that edge in step 130.

The corrections that are applied in step 140 are subject to a number of guidelines. During a correction, it might not be possible to meet a low tolerance when attempting to make an adjustment that is constrained by a higher tolerance. In this event, step 140 allows a tolerance error on the higher tolerance so that the lower tolerance can be met.

The program may re-segment a feature, i.e. divide a polygon into smaller polygons, and correspondingly an edge into shorter edges, in order to allow OPC to achieve one tolerance without violating another tolerance.

Generally, the correction grid allows an edge of a polygon to be shifted in steps of, e.g. 10 nm. Shifting an edge by this amount might, however, result in violation of a tolerance. Accordingly, the program may reduce the step size of the grid. The reduction in step size of the grid might be applied to the whole grid or it might alternatively be applied only in the vicinity of the edge in question.

In addition, after the first iteration of step 140, the program checks whether the features that are tagged with tolerances $\{t_m\}$ (m=1 ... n−1), i.e. higher tolerances, still meet their respective tolerances and, if necessary, adjusts features so that they will continue to meet their respective tolerances.

The corrections made during a given iteration of step 140 might result in moving an edge of a higher tolerance feature into proximity with an edge of a lower tolerance feature and the proximity of the higher tolerance feature to the lower tolerance feature might necessitate adjustment of the lower tolerance feature by an amount that exceeds the tolerance associated with that feature. The next iteration of step 140 will reveal that the distance between the higher tolerance feature and the lower tolerance feature is too small and OPC will then correct the edge of the higher tolerance feature to achieve the necessary spacing of the features.

As suggested above, in each iteration of step 140 the program may apply OPC to all features. Alternatively, the program may apply OPC to fewer than all features. For example, in step n ($1 \leq n \leq k$) the program might apply OPC only to features for which the tolerance derived from step 100 (or assigned in step 130) is equal to $t_n$ or, in an alternative, is equal to or greater than $t_n$. In a given iteration of step 140, OPC may be applied to the applicable features sequentially, e.g. in the order established in step 120, or it may be applied to two or more features simultaneously.

OPC attempts to correct or adjust features of the layout design in order to ensure that the layout design features, when transferred by the optical lithographic system to the wafer, will match the binary pattern described by the input physical design data. In iteration k of step 140, OPC is constrained by the lowest tolerance and the result of iteration k is output physical design data that is used in manufacture. Thus, the output physical design data may be used to make a mask set that is then used to process a wafer using the optical lithographic system that was used to create the model used in the OPC. The mask set produced by the output physical design data results in fabrication of integrated circuit devices that are superior to those that would be fabricated using a mask set that had been produced from the input physical design data.

Figure 3:
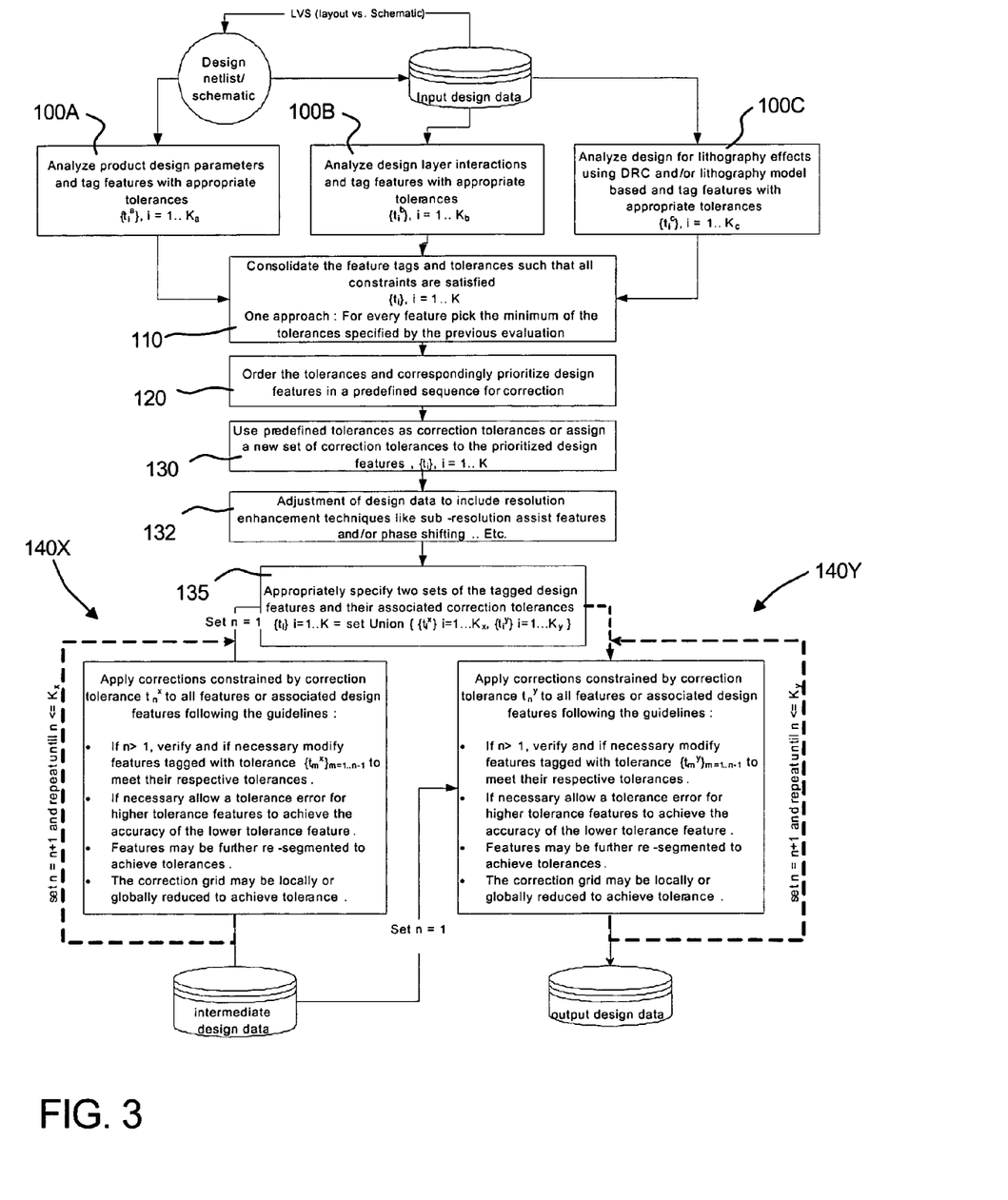
FIG. 3 is a flowchart illustrating a second method embodying the invention

FIG. 3 illustrates the process flow of a second method embodying the present invention.

Steps 100-132 of the method described with reference to FIG. 3 are the same as in the case of the FIG. 2 method. In step 135, the program specifies two sets of tagged features $\{t_i^x\}$ and $\{t_i^y\}$ such that Union $\{\{t_i^x\}, i=1 \ldots k_x, \{t_i^y\}, i=1 \ldots k_y\}$ is equal to $\{t_i\}$, $i=1 \ldots k$. One criterion for distinguishing between the sets is higher tolerances (set $\{t_i^x\}$) and lower tolerances (set $\{t_i^y\}$) or, alternatively, features that are tolerant to variations in the manufacturing process (set $\{t_i^x\}$) and features that are not tolerant to these variations (set $\{t_i^y\}$).

The input physical design data is then processed in step 140X in similar fashion to step 140 of FIG. 2 subject to constraint by the tolerances $\{t_i^x\}$ and this processing leads to intermediate physical design data. The intermediate physical design data produced by step 140X might be sufficiently accurate for use in manufacture but could nevertheless be improved. As suggested above, in one embodiment the corrections in step 140X are applied to features of higher tolerance and typically these features are tolerant to variations in manufacturing conditions. Thus, a subsequent variations in manufacturing conditions would not necessitate adjustment of the corrections made during step 140X. The intermediate data may then be supplied to manufacture or may alternatively be further corrected in step 140Y, which operates similarly to step 140X but with corrections constrained by the tolerances of set $\{t_i^y\}$, which are associated with lower tolerance features that are sensitive to variations in manufacturing conditions. Step 140Y produces output physical design data which is supplied to manufacturing. The output design data may be used to build a mask set that is then used in a given stepper for fabrication of semiconductor devices. If manufacturing conditions should change, for example using a different stepper to expose the wafer, it is not necessary to repeat the entire procedure but it is sufficient to repeat step 140Y with the tolerance values associated with the new stepper.

The programs described with reference to FIGS. 2 and 3 may be carried out using a general purpose computer workstation that is programmed with suitable code sections to perform the various steps that have been described. The programs are stored on suitable computer-readable media and, when executed, cause the computer to carry out the several steps.

It will be appreciated that the invention is not restricted to the particular embodiment that has been described, and that variations may be made therein without departing from the scope of the invention as defined in the appended claims and equivalents thereof. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

The invention claimed is:

1. A method of correction for design data specifying a plurality of features of a semiconductor device, each feature having at least one associated feature tolerance and each tolerance having a magnitude, the method comprising:
   sequentially applying a plurality of corrections to said plurality of features in a predetermined order based on the respective magnitudes of the associated feature tolerances; and
   providing corrected design data.

2. The method of correction for design data of claim 1, wherein the sequence of corrections to the plurality of features is determined by a first set of feature tolerances and the corrections are guided by a second set of feature tolerances.

3. The method of correction for design data of claim 1, wherein the corrections to the plurality of features are determined by the associated feature tolerances.

4. The method of correction for design data of claim 1, wherein said predetermined order is an order from higher tolerance features to lower tolerance features.

5. The method of correction for design data of claim 4, wherein sequentially applying a plurality of corrections includes checking features associated with higher tolerances than the feature tolerance associated with the feature for which the correction is being applied.

6. The method of correction for design data of claim 5, wherein sequentially applying a plurality of corrections includes modifying features associated with higher tolerances than the feature tolerance associated with the feature for which the correction is being applied.

7. The method of correction for design data of claim 5, wherein sequentially applying a plurality of corrections includes modifying features associated with higher tolerances to allow for larger error than the tolerance specified to allow the feature tolerances associated with the features for which the corrections are being applied.

8. The method of correction for design data of claim 1, wherein said predetermined order is an order from lower tolerance features to higher tolerance features.

9. The method of correction for design data of claim 1, further including analyzing the design data and assigning the plurality of feature tolerances to the plurality of features of the design data.

10. The method of correction for design data of claim 1, wherein the plurality of features and the associated feature tolerances are based on lithography constraints.

11. The method of correction for design data of claim 1, wherein the plurality of features and the associated feature tolerances are based on circuit design parameters.

12. The method of correction for design data of claim 1, wherein the plurality of features and the associated feature tolerances are based on lithography effects and circuit design parameters.

13. The method of correction for design data of claim 1, wherein the correction is rule based.

14. The method of correction for design data of claim 1, wherein the correction is model based.

15. The method of correction for design data of claim 1, wherein the correction is rule based and model based.

16. The method of correction for design data of claim 1, further comprising resegmenting one or more of the plurality of features.

17. The method of correction for design data of claim 1, further comprising applying corrections based on step size of a correction grid and changing the correction grid around one or more of the plurality of features.

18. The method of correction for design data of claim 1, wherein a feature is tagged when it is not correctable within an associated tolerance or is allowed to violate the associated tolerance to enable a lower tolerance feature to meet an associated tolerance.

19. A method of correction for design data specifying a plurality of features of a semiconductor device, each feature having at least one associated tolerance, comprising:
classifying the plurality of features into a first plurality of features based on associated feature tolerances and a second plurality of features based on associated feature tolerances;
applying a first plurality of corrections to the first plurality of features to initial design data to provide intermediate design data;
sequentially applying a second plurality of corrections to the intermediate design data; and
providing corrected design data.

20. The method of correction for design data of claim 19, further including arranging the plurality of features based on the respective magnitudes of the associated feature tolerances in an order from higher tolerance features to lower tolerance features and sequentially applying the first plurality of corrections to the first plurality of features in said order.

21. The method of correction for design data of claim 19, wherein each tolerance has a magnitude and the method further includes arranging the plurality of features based on the respective magnitudes of the associated feature tolerances in an order from lower tolerance features to higher tolerance features and sequentially applying the first plurality of corrections to the first plurality of features in said order.

22. The method of correction for design data of claim 19, wherein each tolerance has a magnitude and the method further includes arranging the plurality of features based on the respective magnitudes of the associated feature tolerances in any predetermined order.

23. The method of correction for design data of claim 19, wherein each tolerance has a magnitude and the method further includes analyzing the design data and assigning feature tolerances to features of the initial design data.

24. The method of correction for design data of claim 19, wherein the feature tolerances are based on lithography effects.

25. The method of correction for design data of claim 19, wherein the feature tolerances are based on product design parameters.

26. The method of correction for design data of claim 19, wherein the feature tolerances are based on lithography effects and product design parameters.

27. The method of correction for design data of claim 19, wherein the corrections are rule based.

28. The method of correction for design data of claim 19, wherein the corrections are model based.

29. The method of correction for design data of claim 19, wherein the corrections are rule based and model based.

30. The method of correction for design data of claim 19, further comprising resegmenting one or more of the plurality of features.

31. The method of correction for design data of claim 19, further comprising applying corrections based on step size of a correction grid and changing the correction grid around one or more of the plurality of features.

32. The method of correction for design data of claim 19, wherein the tolerances associated with the second plurality of features are smaller than the tolerances associated with the first plurality of features and sequentially applying a second plurality of corrections to the intermediate design data comprises applying corrections to features of the second plurality in order from higher tolerance features to lower tolerance features.

33. A semiconductor device created by
receiving initial design data specifying a plurality of features of a semiconductor device, each feature having at least one associated feature tolerance and each tolerance having a magnitude;
correcting the initial design data by sequentially applying a plurality of corrections to the plurality of features based on the associated feature tolerances in a predetermined order based on the respective magnitudes of the associated feature tolerances to provide corrected design data; and
manufacturing the semiconductor device based on the corrected design data.

34. The device of claim 33, wherein correcting the initial design data further includes arranging the feature tolerances in an order from higher tolerance features to lower tolerance features.

35. The device of claim 33, wherein correcting the initial design data further includes arranging the feature tolerances in an order from lower tolerance features to higher tolerance features.

36. The device of claim 33, wherein correcting the initial design data further includes arranging the feature tolerances in any predetermined order.

37. The device of claim 33, wherein sequentially applying the plurality of corrections includes checking features that have previously been corrected to determine whether the tolerances associated with those features have been violated.

38. A semiconductor device created by
receiving initial design data specifying a plurality of features of a semiconductor device, each feature having at least one associated feature tolerance;
correcting the initial design data by
classifying the plurality of features into a first plurality of features based on associated feature tolerances and a second plurality of features based on associated feature tolerances;
applying a first plurality of corrections to the first plurality of features to provide intermediate design data; and
sequentially applying a second plurality of corrections to the intermediate data; and providing corrected design data; and
manufacturing the semiconductor device based on the corrected design data.

39. The device of claim 38, wherein each tolerance has a magnitude and correcting the initial design data further includes arranging the plurality of features based on the respective magnitudes of the associated feature tolerances in an order from higher tolerance features to lower tolerance features and applying a first plurality of corrections to the first plurality of features comprises sequentially applying corrections to the first plurality of features in said order.

40. The device of claim 38, wherein each tolerance has a magnitude and correcting the initial design data further includes arranging the plurality of features based on the respective magnitudes of the associated feature tolerances in an order from lower tolerance features to higher tolerance features and applying a first plurality of corrections to the first plurality of features comprises sequentially applying corrections to the first plurality of features in said order.

41. The device of claim 38, wherein each tolerance has a magnitude and correcting the initial design data further includes arranging the plurality of features based on the respective magnitudes of the associated feature tolerances in any predetermined order and applying a first plurality of corrections to the first plurality of features comprises sequentially applying corrections to the first plurality of features in said order.

42. The device of claim 38, wherein each tolerance has a magnitude, the tolerances associated with the second plurality of features being smaller than the tolerances associated with the first plurality of features, and sequentially applying the second plurality of corrections to the intermediate design data further includes checking features that have previously been corrected to determine whether the tolerances associated with those features have been violated.

43. A correction computer program for correcting design data specifying a plurality of features of a semiconductor device, each feature having at least one associated feature tolerance and each tolerance having a magnitude, the computer program being embodied on computer readable media and comprising:
 a tolerance application code segment for sequentially applying a plurality of corrections to the plurality of features in a predetermined order based on the respective magnitudes of the associated feature tolerances; and
 a correction code segment that provides the corrected design data using corrections on a plurality of features based on the associated plurality of feature tolerances.

44. The correction computer program embodied on computer readable media of claim 43, further including an ordering code segment for arranging the plurality of features and the plurality of associated feature tolerances in an order from higher tolerance features to lower tolerance features.

45. The correction computer program embodied on computer readable media of claim 43, further including an ordering code segment for arranging the plurality of features and the plurality of associated feature tolerances in an order from lower tolerance features to higher tolerance features.

46. The correction computer program embodied on computer readable media of claim 43, further including an ordering code segment for arranging the plurality of features and the plurality of associated feature tolerances in any predetermined order.

47. The correction computer program embodied on computer readable media of claim 43, wherein the correction application code segment further includes code for checking features that have previously been corrected to determine whether the tolerances associated with those features have been violated.

48. The correction computer program embodied on computer readable media of claim 43, wherein the correction application code segment includes code for checking a feature that has previously been corrected to determine whether a tolerance associated with that feature has been violated and, if so, modifying the feature.

49. A correction computer program for correcting design data specifying a plurality of features each feature having at least one associated feature tolerance, the computer program being embodied on computer readable media and comprising:
 an arranging code portion for arranging a plurality of feature tolerances in a predetermined order based on respective magnitudes of the associated feature tolerances;
 a first application code portion for applying a plurality of corrections to the plurality of features based on the associated feature tolerances to initial design data to provide intermediate design data;
 a second application code portion for sequentially applying a plurality of corrections to the intermediate design data; and
 an output code portion for providing corrected design data.

50. The correction computer program embodied on computer readable media of claim 49, wherein the second application code portion further code for checking features that have previously been corrected to determine whether the tolerances associated with those features have been violated.

51. The correction computer program embodied on computer readable media of claim 49, wherein the second application code portion includes code for checking a feature that has previously been corrected to determine whether a tolerance associated with that feature has been violated and, if so, modifying the feature.

52. A correction system, comprising:
 at least one processor; and
 a processor readable memory accessible by at least one processor that stores instructions for
  applying a plurality of corrections to initial design data specifying a plurality of features, each feature having at least one associated feature tolerance, to provide intermediate design data, wherein said plurality of corrections are based on the associated feature tolerances;
  sequentially applying a plurality of corrections based on a plurality of feature tolerances to the intermediate design data in a predetermined order; and
  outputting corrected design data.

53. The correction system of claim 52, wherein the processor readable memory accessible by at least one processor further stores instructions for checking features that have previously been corrected to determine whether the tolerances associated with those features have been violated.

54. The correction system of claim 52, wherein the processor readable memory accessible by at least one processor further stores instructions for checking a feature that has previously been corrected to determine whether a tolerance associated with that feature has been violated and, if so, modifying the feature.

55. A correction system, comprising:
 at least one processor; and
 a processor readable memory accessible by at least one processor that stores instructions for
  sequentially applying a plurality of corrections to initial design data specifying a plurality of features, each feature having at least one associated feature tolerance and each tolerance having a magnitude, wherein the plurality of corrections are applied to the initial design data in a predetermined order based on the respective magnitudes of the associated feature tolerances; and
  providing corrected design data.

56. The correction system of claim 55, wherein the processor readable memory accessible by at least one processor further stores instructions for checking features that have previously been corrected to determine whether the tolerances associated with those features have been violated.

57. The correction system of claim 55, wherein the processor readable memory accessible by at least one processor further stores instructions for checking a feature that has previously been corrected to determine whether a tolerance associated with that feature has been violated and, if so, modifying the feature.

58. An integrated circuit mask formed by:
 sequentially applying a plurality of corrections to initial design data specifying a plurality of features, each feature having at least one associated feature tolerance and each tolerance having a magnitude, wherein the plurality of corrections are applied to the initial design data in a predetermined order based on the respective magnitudes of the associated feature tolerances; and providing corrected design data.

59. The integrated circuit mask of claim 58, wherein sequentially applying a plurality of corrections based on a plurality of associated feature tolerances includes checking features that have previously been corrected to determine whether the tolerances associated with those features have been violated.

60. The integrated circuit mask of claim 58, wherein sequentially applying a plurality of corrections based on a plurality of associated feature tolerances includes checking a feature that has previously been corrected to determine whether a tolerance associated with that feature has been violated and, if so, modifying the feature.

61. The integrated circuit mask of claim 58, wherein the corrected design data is further formed by arranging the plurality of feature tolerances in an order from higher tolerance feature to lower tolerance feature.

62. The integrated circuit mask of claim 58, wherein the corrected design data is further formed by arranging the plurality of feature tolerances in any predetermined order.

63. An integrated circuit mask formed by:
designating a first plurality of design features based on associated feature tolerances:
designating a second plurality of design features based on associated feature tolerances each feature having a magnitude;
applying a first plurality of corrections to the first plurality of design features to provide intermediate design data;
sequentially applying a second plurality of corrections to the intermediate design data to the second plurality of design features in an order based on the respective magnitudes of the tolerances associated with the second plurality of design features; and
providing corrected design data.

64. The integrated circuit mask of claim 63, wherein the mask is further formed by arranging the plurality of feature tolerances in an order from higher feature tolerances to lower feature tolerance.

65. The integrated circuit mask of claim 63, wherein sequentially applying the plurality of corrections based on feature tolerances to the intermediate design data further includes checking features that have previously been corrected to determine whether the tolerances associated with those features have been violated.

66. The integrated circuit mask of claim 63, wherein sequentially applying the plurality of corrections based on feature tolerances to the intermediate design data further includes checking a feature that has previously been corrected to determine whether a tolerance associated with that feature has been violated and, if so, modifying the feature.

67. A method of correction for design data specifying a plurality of features of a semiconductor device, each feature having at least one associated tolerance and each tolerance having a magnitude, the method comprising:
sequentially applying a plurality of corrections based on feature tolerances to initial design data in an order from a feature having a higher magnitude tolerance to a feature having a lower magnitude tolerance; and
providing corrected design data.

* * * * *